United States Patent Office 3,790,560
Patented Feb. 5, 1974

3,790,560
DERIVATIVES OF LINCOMYCIN AND ITS
ANALOGS AND PROCESS
Brian Bannister, Kalamazoo, Mich., assignor to The
Upjohn Company, Kalamazoo, Mich.
No Drawing. Continuation-in-part of application Ser. No.
198,990, Nov. 15, 1971, which is a continuation-in-part
of abandoned applications Ser. No. 158,075, June 29,
1971, and Ser. No. 161,909, July 12, 1971, the latter
being a continuation-in-part of abandoned application
Ser. No. 156,100, June 23, 1971. This application Mar.
22, 1972, Ser. No. 237,129
Int. Cl. C08b 19/00
U.S. Cl. 260—210 R            23 Claims

ABSTRACT OF THE DISCLOSURE

Alkyl 7-deoxy-7-mercaptoalkylthio-α-thiolincosaminides useful as intermediates for preparing antibacterially active 7-deoxy-7-mercaptoalkylthio-lincomycins are prepared by heating alkyl N-acyl-6,7-aziridino-6-deamino-7-deoxy-α-thiolincosaminides with an appropriate sulfide in the presence of glacial acetic acid or other anhydrous lower alkanoic acid, or anhydrous benzoic acid or other arenoic acid or not more than 12 carbon atoms.

CROSS REFERENCE TO RELATED APPLICATIONS

This application is a continuation in part of our copending application Ser. No. 198,990, filed Nov. 15, 1971, which is a continuation in part of our copending application Ser. No. 158,075, filed June 29, 1971, now abandoned, and our copending application Ser. No. 161,909, filed July 12, 1971, now abandoned, which is a continuation in part of our copending application Ser. No. 156,-100, filed June 23, 1971, now abandoned.

BRIEF DESCRIPTION OF THE INVENTION

The invention relates to alkyl 7-deoxy-7-mercaptoalkylthio-α-thiolincosaminides of Formula I and acylates thereof and to a process for making the same

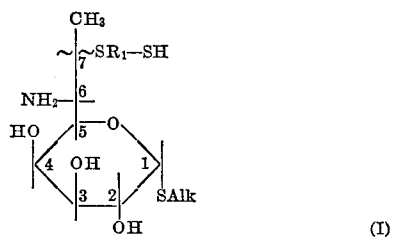

(I)

wherein Alk is alkyl of not more than 4 carbon atoms, to wit, methyl, ethyl, propyl, isopropyl, butyl, sec.butyl, isobutyl, and tert.butyl, or 2-hydroxyethyl; $R_1$ is a saturated aliphatic hydrocarbon radical (alkylene) of 2 to not more than 18 carbon atoms.

The compounds of Formula I can be obtained by heating in the presence of glacial acetic acid or other anhydrous loweralkanoic acid, or anhydrous benzoic acid or other arenoic acid of not more than 12 carbon atoms, an alkyl N - acyl-6,7-aziridino-6-deamino-7-deoxy-α-thiolincosaminide of the formula:

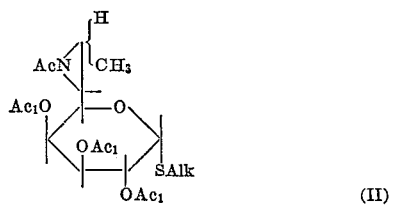

(II)

wherein Ac and $Ac_1$ are carboxacyl and Alk is as given above, with sulfide of the formula $R_2$—S—$R_1$—$SR_3$ wherein $R_1$ is as given above and $R_2$ is a saturated aliphatic hydrocarbon radical of not more than 18 carbon atoms, unsaturated aliphatic hydrocarbon radical of not more than 10 carbon atoms, cycloaliphatic hydrocarbon radical of not more than 10 carbon atoms, aromatic hydrocarobn radical of not more than 11 carbon atoms; or oxacarbocyclic aromatic or thiacarbocyclic aromatic hydrocarbon radical of not more than 8 carbon atoms; and $R_3$ is carboxacyl ($Ac_1$) or hydrogen when $R_1$ is a primary trimethylene group or a secondary lower trimethylene group. A primary trimethylene group is —$(CH_2)_3$—, i.e., one in which all the non-radical valences are satisfied by hydrogen. A secondary trimethylene group, one in which one of the non-radical valences is satisfied by carbon. A lower secondary trimethylene group is one containing not more than 8 carbon atoms. Opening of the aziridine ring is thus effected yielding an acylated alkyl 7-deoxy-7-mercaptoalkylthio- or 7 - acylthioalkylthio-α-thiolincosaminide of the following formula:

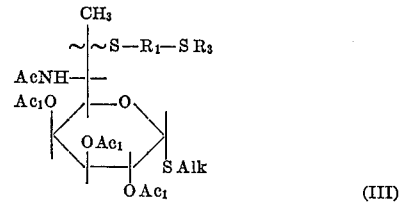

(III)

wherein Ac, $Ac_1$, $R_1$, $R_3$, and Alk are as given above.

The acyl groups are then removed by hydrazinolysis in a manner already well known in the art (See U.S. 3,179,-565) to yield alkyl 7-deoxy-7-mercaptoalkylthio-α-thiolincosaminide of Formula I.

The compounds of the invention (Formula I) are useful for the same purposes as methyl α-thiolinicosaminide (methyl 6 - amino-6,8-dideoxy-1-thio-D-erythro-α-D-galacto-octopyranoside, α-MTL) as disclosed in U.S. Pat. 3,380,992 and as methyl 6-amino-7-chloro-6,7,8-trideoxy-L-threo- and D-erythro-1-thio-α-D-galacto-octopyranosides (U.S. Pats. 3,496,163 and 3,502,648) and moreover can be acylated with trans-1-methyl-4-propyl-L-2-pyrrolidine carboxylic acid to form carboxylic amides as disclosed in these patents or with an N-(2-hydroxyethyl)-L-2-pyrrolidine carboxylic acid to form compounds of the formula:

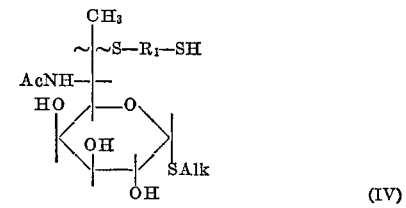

(IV)

where $R_1$ and Alk are as given and Ac is L-2-pyrrolidinecarboxacyl of an N-methyl, N-ethyl, or N-(2-hydroxyethyl)-L-2-pyrrolidinecarboxyacyl any or all of which can be substituted in the 4-position with loweralkyl or loweralkylidene.

PRIOR ART

It is known that 7-SH analogs can be prepared by heating an aziridino compound of Formula II where Ac and $Ac_1$ are hydrogen with hydrogen sulfide (U.S. Pat. 3,544,-551). It has not been possible, heretofore, to replace the S-hydrogen, either directly or indirectly. Moreover, the compounds of the invention are substantially more active than the corresponding 7-SH compounds. For example, 7-deoxy-7(S)-(mercaptoalkylthio)-lincomycin hydrochlorides are more active in vitro against Gram positive bacteria than lincomycin whereas 7-deoxy-7(S)-mercaptolincomycin hydrochloride is less active than lincomycin.

It is also known that 7-OR analogs can be prepared by reacting a compound of Formula II with an alcohol in the presence of an acid. Efforts to produce the sulfur analogs by substituting the alcohol by a mercaptan have been unsuccessful.

DETAILED DESCRIPTION

It has now been found that compounds of Formula II undergo sulfidolysis when heated with a sulfide of the formula $R_2$—S—$R_1$—S—$Ac_1$ in glacial acetic acid or other anhydrous lower-alkanoic acid or anhydrous benzoic acid or other arenoic acid of not more than 12 carbon atoms. The reaction appears to take the following course:

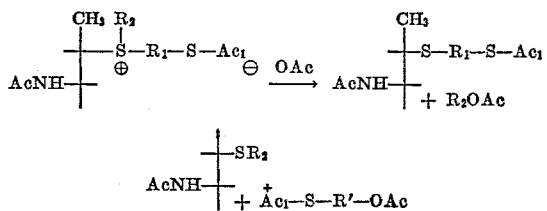

Unless the mercapto group is protected by a carboxacyl group, the resulting product is

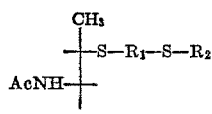

except where $R_1$ is the primary trimethylene group, or a secondary lower trimethylene group. In that case there is obtained a mixture of

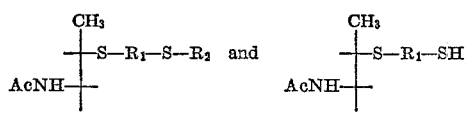

When $R_2$ is methyl, the two products have such similar properties that they are difficult to separate. Separation can be effected, though, by acylation with acetic anhydride in pyridine followed by Craig countercurrent distribution in a suitable solvent system.

The desired reaction is obtained simply by heating an alkyl N - acetyl - 6,7 - aziridino-6-deamino-7-deoxy-α-thiolincosaminide with the appropriate sulfide in glacial acetic acid or other anhydrous lower alkanoic acid or anhydrous benzoic acid or other arenoic acid of not more than 12 carbon atoms, for example, propionic or butyric acids.

Advantageously, a solvent boiling at about 70 to 110° is used. Ordinarily an excess of sulfide is used for this purpose. Such solvents as dioxane, carbon tetrachloride, benzene, or toluene can be used if desired and advantageously with sulfides boiling above about 110°.

The proportions are not critical to the reaction, but are critical to the yields. Thus optimum yields are obtained with about 3 to 7 equivalents of acid coupled with a substantial excess, at least twofold, of the sulfide. That is another advantage of using the sulfide as a solvent. When a sulfide, such as methyl sulfide, which is so low boiling as to give a reaction mixture that refluxes below 70°, is used, super atmospheric pressure can be used; if it is such that the reaction mixture boils above about 110° controlled heating can be used. Otherwise it is suitable to heat at the reflux temperature.

The reaction mixture can be worked up by procedures already well known in the art such as countercurrent distribution, chromatography, and solvent extraction or crystallization.

The starting compounds of Formula II exist in two epimeric forms as follows:

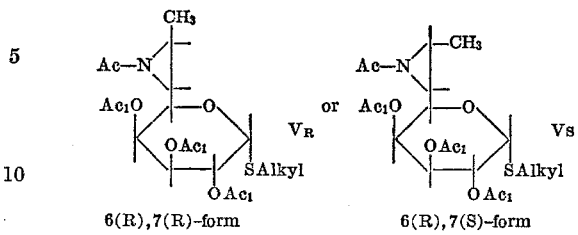

6(R),7(R)-form      6(R),7(S)-form

In the reaction an inversion takes place. For example, when methyl sulfide is reacted with methyl N-acetyl-2,3,4-tri-O-acetyl-6(R),7(R)-aziridino - 6 - deamino - 7-deoxy-α-thiolincosaminide, methyl N-acetyl-2,3,4-tri-O-acetyl - 7 - deoxy-7(S)-(methylthio)-α-thiolincosaminide is obtained.

The starting compound of Formula II are obtained by acylating a compound of the formula:

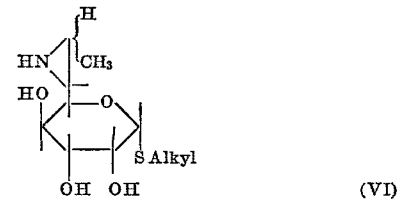

with a carboxacyl acylating agent, such as, acetic anhydride or other lower alkanoic acid anhydride or benzoyl chloride or like carboxacyl halide, in a manner already known in the art. Since the amino and hydroxy groups acylate at different rates the N-acyl, Ac, and the O-acyls, $Ac_1$, can be the same or different.

Inasmuch as these acyl groups (Ac and $Ac_1$) do not appear in the final product but are removed in the processing, it is immaterial what they are as long as they are carboxacyl. Suitable such carboxacyls are hydrocarboncarboxacyl containing not more than 18 carbon atoms or halo-, nitro-, hydroxy-, amino-, cyano-, thiocyano-, or alkoxysubstituted hydrocarbon carboxacyls of not more than 18 carbon atoms. Advantageously, they are inert carboxacyls, that is to say, carboxacyls that are not affected by the reaction. Most commonly they will be acetyl or other lower alkanoyl, or benzoyl or other aroyl of not more than 12 carbon atoms. Nonetheless, they may be any carboxacyl.

The starting compounds of Formula VI can be prepared by the dehydrohalogenation of compounds of the formula:

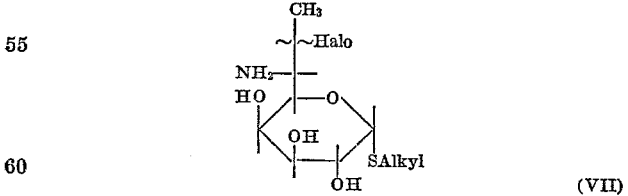

which are known in the art, U.S. Pat. 3,502,648. The dehydrohalogenation is effected according to U.S. Pat. 3,502,648. The dehydrohalogenation is effected according to U.S. Pat. 3,544,551 by heating a compound of Formula VII in an inert solvent in the presence of an acid acceptor. A suitable process is to heat a reaction mixture of starting compound, anhydrous sodium carbonate, and dimethylformamide at reflux for a short time, remove the solvent, and crystallize from a suitable solvent, for example, methanol. See Belgian Pat. 732,352, Oct. 30, 1969.

The starting sulfides of formula $R_2$—S—$R_1$—$SR_3$ are known compounds. They can be acylated in a known manner using, for example, the appropriate acid halide or anhydride in pyridine. Suitable starting compounds that require acylation include 2-(methylthio)-ethanethiol,
2-(ethylthio)-ethanethiol,
2-(isopropylthio)-ethanethiol,
2-(propylthio)-ethanethiol,
2-(butylthio)-ethanethiol,
2-(cyclohexylthio)-ethanethiol,
1-(ethylthio)-2-propanethiol,
1-(isopropylthio)-2-propanethiol,
2-(isopropylthio)-1-propanethiol,
1-(allylthio)-2-propanethiol,
2-(benzylthio)-1-propanethiol,
2-(butylthio)-1-(2-methyl)-propanethiol,
1-(butylthio)-2-(2-methyl)-propanethiol,
2-methyl-2-(pentylthio)-1-propanethiol,
2-(hexylthio)-1-(2-methyl)-propanethiol,
1-(hexylthio)-2-(2-methyl)-propanethiol,
1-(heptylthio)-2-(2-methyl)-propanethio,
2-(2-ethylhexylthio)-1-(2-methyl)-propanethiol,
1-(2-ethylhexylthio)-2-(2-methyl)-propanethiol,
2-(dodecylthio)-1-(2-methyl)-propanethiol,
1-(dodecylthio)-2-(2-methyl)-propanethiol, and
4-(methylthio)-1-butanethiol.

Suitable sulfides that do not require acylation, but which nevertheless may be acylated, if desired, include 3-(methylthio)-1-propanethiol, 3-(ethylthio)-1-propanethiol, 3-(allylthio)-1-propanethiol, and 3-(octylthio)-1-propanethiol.

When the sulfhydryl group is esterified, usually the ester will be the acetate or the benzoate but for reasons given above in respect to the Ac and $Ac_1$ groups, they can be any carboxacyl. In other words the hydrogen of the sulfhydryl group can be replaced by an $Ac_1$ group which may be the same or different from the $Ac_1$ groups in the 2-, 3-, 4-O-positions.

By acylating the compounds of the invention (Formula I) with an L-2-pyrrolidinecarboxylic acid, antibacterial active compounds of Formula IV in which Ac is the acyl of the L-2-pyrrolidinecarboxylic acid are obtained. For example, when Alk is methyl, $R_1$ is ethylene or trimethylene, and the L-2-pyrrolidinecarboxylic acid is trans-1-methyl-4-propyl-L-2-pyrrolidinecarboxylic acid and the configuration is (S), the compounds are 7-deoxy-7(S)-(3-mercaptopropylthio)-lincomycin and 7-deoxy-7(S)-(2 - mercaptoethylthio)-lincomycin which have antibacterial activity several times that of lincomycin. It and its analogs can be utilized for the same purposes and in the same way as lincomycin.

The compounds of the invention (Formula I) as well as the acylated thereof with an L-2-pyrrolidinecarboxylic acid can exist in either the free base form or in the form of an acid addition salt. Unless otherwise specified or otherwise dictated by the context both the acid addition from and the free base form are intended. These acid addition salts can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclyhexenecarboxylic, octadecenylsuccinic, octenylsuccinic, methanesulfonic, benzenesulfonic, helianthic, Reinecke's, dimethyldithicarbamic, hexadecylsulfamic, octadecylsulfamic, sorbic, monochloroacetic, undecylenic, 4' - hydroxyazobenzene - 4 - sulfonic, octyldecylsulfuric, picric, benzoic, cinnamic, and like acids.

The acid addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis.

The free bases can be used as buffers or as antacids. They react with isocyanates to form urethanes and can be used to modify polyurethane resins. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

The invention may now be more fully understood by reference to the following examples in which the parts are by weight except where solvent ratios are given or except as otherwise specified and the c.g.s. system is used unless otherwise specified.

EXAMPLE 1

Methyl 7-deoxy-7(S)-(2-mercaptoethylthio)-α-thiolincosaminide

Part A-1: Methyl N-acetyl-2,3,4-tri-O-acetyl-7(S)-2-(acetylthioethylthio)-7-deoxy-α-thiolincosaminide

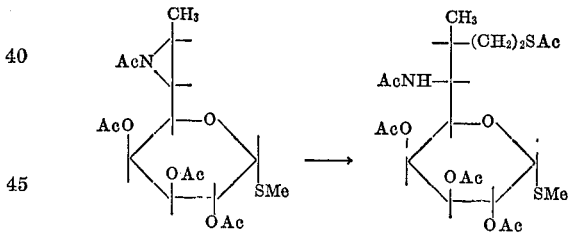

A mixture of 10.0 gms. (1 mol. equiv.) methyl N-acetyl-2,3,4-tri-O-acetyl-6(R),7(R)-aziridino-6-deamino - 7 - deoxy-α-thiolincosaminide, 76 gms. 2-(methylthio)-ethanethiol acetate, and 7.35 gms. (4.9 mol. equivs.) glacial acetic acid is heated in an oil bath at 110° C. for 20 hours. Volatile materials are removed from the colorless reaction solution by distillation at 100° C. under reduced pressure. The residue is dissolved in methylene chloride and stirred with an excess of saturated aqueous sodium bicarbonate. Washing of the organic layer with water, drying over anhydrous sodium sulfate, and removal of the solvent on a rotating evaporator at 40°/7 mm. gives a colorless solid (12.43 gms.), showing no starting material by TLC ($SiO_2$ gel, 1 acetone:1 Skellysolve B) and a major new zone of slightly lower $R_f$. TLC refers to thin layer chromatography and Skellysolve B is technical hexane.

Countercurrent distribution of this solid in the system 1 ethanol:1 water:1 ethyl acetate:3 cyclohexane gives methyl N-acetyl-2,3,4-tri-O-acetyl-7(S)-(2-acetylthioethylthio)-7-deoxy-α-thiolincosaminide at a K value of 1.55 as colorless rods from ethyl acetate having the following characteristics:

M.P. 198–9° C.
$[\alpha]_D$ +168° c., 1.0, chloroform)
Analysis.—Calcd. for $C_{21}H_{33}O_9NS_3$ (percent): C, 46.73; H, 6.16; N, 2.60; S, 17.63; mol. wt. 539.68. Found (percent): C, 46.84; H, 6.05; N, 2.56; S, 17.52; mol wt. [(mass spec., M+) —HCHS] 493.
UV: λ max. (EtOH)
231 nm.: ε 4150

On heating with hydrazine hydrate under gentle reflux in an oil bath at 160° C. for 22 hrs., there is obtained methyl 7-deoxy-7(S)-(2-mercaptoethylthio)-α-thiolincosaminide.

On acylation with the mixed anhydride of trans-propylhygric acid and mono-isobutyl formate (obtained by reacting trans-propylhygric acid with isobutyl chloroformate) by the process of U.S. Pat. 3,380,992, there is obtained 7-deoxy-7(S) - (2-mercaptoethylthio)-lincomycin hydrochloride.

EXAMPLE 2

Methyl 7(S)-(3-acetylthiopropylthio)-7-deoxy-α-thiolincosaminide

A mixture of 10 gms. (1 mol. equiv.) methyl N-acetyl-2,3,4 - tri - O - acetyl - 6(R),7(R) - aziridino - 6 - deamino-7-deoxy-α-thiolincosaminide, 50 gms. of 3-(methylthio)-1-propanethiol, and 5.25 gms. (3.5 mol. equivs.) glacial acetic acid is heated in an oil bath at 100° C. for 17 hours. Volatile materials are removed from the reaction by distillation at 100° C./7 mm. giving a pale yellow syrup which was dissolved in methylene chloride. This solution is then washed with saturated aqueous sodium bicarbonate, then with water and then dried over anhydrous sodium sulfate. The solvent is removed on a rotating evaporator at 40° C./7 mm. giving a tan solid (12.71 gms.).

Countercurrent distribution of this solid in the system 1 ethanol:1 water:1 ethyl acetate:3 cyclohexane gives methyl N-acetyl-2,3,4-tri-O-acetyl-7-deoxy-7(S)-(methylthio)-α-thiolincosaminide (14%) at a K value of 0.82 and a mixture (86%) of methyl N-acetyl-2,3,4-tri-O-acetyl - 7 - deoxy - 7(S) - (3 - methylthiopropylthio) - α-thiolincosaminide (40%) and methyl N-acetyl-2,3,4-tri-O-acetyl - 7 - deoxy - 7(S) - (3 - mercaptopropylthio) - α-thiolincosaminide (60%) at a K value of 2.33.

The above mixture (K=2.33) is acetylated in pyridine acetic anhydride at room temperature overnight. The excess reagents are removed on a rotating evaporator at 40° C./7 mm. The residue is taken up in methylene chloride and washed successively with dilute aq. hydrochloric acid, water, saturated aq. sodium bicarbonate, and water and then dried over anhydrous sodium sulfate. The solvent is removed on a rotating evaporator at 40° C./7 mm. and the residual solid subjected to countercurrent distribution in the solvent system 1 ethanol:1 water:0.5 ethyl acetate:3 cyclohexane. Methyl N-acetyl-2,3,4-tri-O-acetyl-7-deoxy-7(S) - (3 - methylthiopropylthio) - α - thiolincosaminide (1.62 gms.) is obtained at a K value of 1.0. The desired product, methyl N-acetyl-2,3,4-tri-O-acetyl-7-deoxy-7(S)-(3-acetylthiopropylthio)-α-thiolincosaminide (2.64 gms.) is obtained at a K value of 0.67 with the following characteristics:

Colorless needles from ethyl acetate-Skellysolve B
M.P. 170-170.5° C.
$[α]_D$ +170° (c., 1.05 CHCl₃)
Analysis.—Calcd. for $C_{22}H_{35}NO_9S_3$ (percent): C, 47.72; H, 6.37; N, 2.53; S, 17.37. Found (percent): C, 47.62; H, 6.42; N, 2.60; S, 17.50.
UV: λ max. (EtOH) 231 nm., ε 4450

Following the procedure of Example 1, there is obtained methyl 7-deoxy-7(S)-(3 - mercaptopropylthio)-α-thiolincosaminide, and 7-deoxy-7(S)-(3 - mercaptopropylthio)lincomycin hydrochloride.

EXAMPLE 3

Alternative to Example 2

Following the procedure of Example 1, substituting the methylthioethanethiol acetate by 3-(methylthio)-1-propanethiol acetate, there are obtained methyl 7-deoxy-7(S)-(3-acetylthiopropylthio)-α-thiolincosaminide, having the characteristics given in Example 2.

I claim:
1. A compound of the formula

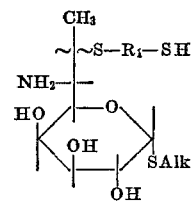

wherein Alk is alkyl of not more than 4 carbon atoms or 2-hydroxyethyl and $R_1$ is alkylene of not more than 18 carbon atoms.

2. A compound of claim 1 in which $R_1$ is ethylene or trimethylene.

3. A compound of claim 1 in which Alk is methyl.

4. A compound of claim 2 in which Alk is methyl.

5. Methyl 7-deoxy-7(S)-(2-mercaptoethylthio)-α-thiolincosaminide, a species under claim 1.

6. Methyl 7-deoxy-7(S) - (3-mercaptopropylthio)-α-thiolincosaminide, a species under claim 1.

7. A compound of the formula

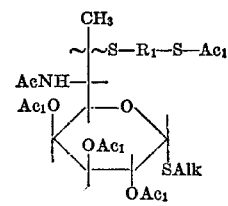

wherein $R_1$ is primary trimethylene or secondary trimethylene and in which Alk is alkyl of not more than 4 carbon atoms or 2-hydroxyethyl and Ac and $Ac_1$ are each selected from hydrocarbon carboxacyl containing not more than 18 carbon atoms and halo-, nitro-, hydroxy-, amino-, cyano-, thiocyano- or alkoxy-substituted hydrocarbon carboxacyl of not more than 18 carbon atoms.

8. A compound of claim 7 in which Ac and $Ac_1$ are lower alkanoyl or arenoyl of not more than 12 carbon atoms.

9. A compound of claim 7 in which Ac and $Ac_1$ are acetyl.

10. Methyl N-acetyl-2,3,4-tri-O-acetyl-7-deoxy-7(S)-(3-acetylthiopropylthio)-α-thiolincosaminide, a species of claim 7.

11. A compound of the formula

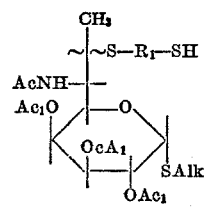

in which Alk is alkyl of not more than 4 carbon atoms or 2-hydroxyethyl and Ac and $Ac_1$ are each selected from hydrocarbon carboxacyl containing not more than 18 carbon atoms and halo-, nitro-, hydroxy-, amino-, cyano-, thiocyano- or alkoxy-substituted hydrocarbon carboxacyl of not more than 18 carbon atoms; and $R_1$ is primary trimethylene or secondary lower trimethylene.

12. A compound of claim 11 in which Ac and $Ac_1$ are lower alkanoyl or arenoyl of not more than 12 carbon atoms.

13. A compound of claim 11 in which Ac and $Ac_1$ are lower alkanoyl.

14. A compound of claim 11 in which Ac and $Ac_1$ are acetyl.

15. Methyl N-acetyl-2,3,4-tri-O-acetyl-7-deoxy-7(S)-3-mercaptopropylthio-α-thiolincosaminide, a species of claim 11.

16. A compound of the formula

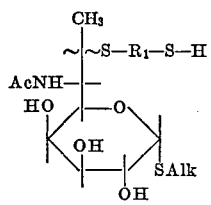

wherein Alk is alkyl of not more than 4 carbon atoms or 2-hydroxyethyl, $R_1$ is alkylene of not more than 18 carbon atoms and Ac is the acyl of an L-2-pyrrolidinecarboxylic acid.

17. A process for making compounds of the formula

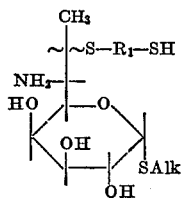

which consists of (A) heating at a temperature up to reflux temperature, a mixture of (1) an aziridino compound of the formula

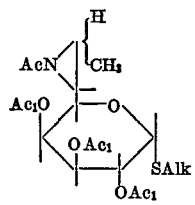

with (2) a sulfide of the formula $R_2$—S—$R_1$—$SR_3$, Ac and $Ac_1$ being hydrocarbon carboxacyl selected from those containing not more than 18 carbon atoms and halo-, nitro-, hydroxy-, amino-, cyano-, thiocyano- or alkoxy-substituted hydrocarbon carboxacyl of not more than 18 carbon atoms; Alk being alkyl of not more than 4 carbon atoms or 2-hydroxyethyl; $R_1$ being alkylene of 2 to not more than 18 carbon atoms; $R_2$ being a saturated aliphatic hydrocarbon radical of not more than 18 carbon atoms, an unsaturated aliphatic hydrocarbon radical of not more than 10 carbon atoms; an aromatic hydrocarbon radical of not more than 11 carbon atoms; or an oxacarbocyclic aromatic or thiacarbocyclic aromatic hydrocarbon radical of not more than 8 carbon atoms; and $R_3$ is hydrocarbon carboxacyl containing not more than 18 carbon atoms or halo-, nitro-, hydroxy-, amino-, cyano-, thiocyano-, or alkoxy-substituted hydrocarbon carboxacyl of not more than 18 carbon atoms or hydrogen when $R_1$ is a primary trimethylene group or a secondary lower trimethylene group, in the presence of (3) an anhydrous lower alkanoic or arenoic acid of not more than 12 carbon atoms and optionally (4) a solvent having a boiling point of between about 70° C. to 110° C.; and (B) removing the hydrocarbon carboxacyl or halo-, nitro-, hydroxy-, amino-, cyano-, thiocyano-, or alkoxy-substituted hydrocarbon carboxacyl groups by hydrazinolysis.

18. The process of claim 17 in which $R_1$ is primary trimethylene or secondary lower trimethylene and $R_3$ is hydrogen.

19. A process of claim 17 in which $R_1$ is —$(CH_2)_3$— and $R_3$ is hydrogen.

20. A process of claim 17 in which $R_3$ is hydrocarbon carboxacyl or halo-, nitro-, hydroxy-, amino-, cyano-, thiocyano-, or alkoxy-substituted hydrocarbon carboxacyl.

21. A process of claim 20 in which $R_1$ is ethylene.

22. The process of claim 17 wherein said anhydrous acid is glacial acetic acid.

23. The process of claim 17 wherein the proportion of sulfide is at least 2 molar equivalents and the proportion of acid is from 3 to about 7 equivalents; for each equivalent of aziridino compound.

References Cited
UNITED STATES PATENTS
3,598,806   8/1971   Morozowich _____ 260—210 R JOHNNIE R. BROWN, Primary Examiner U.S. Cl. X.R.
260—9 R; 424—180